Figure 1:
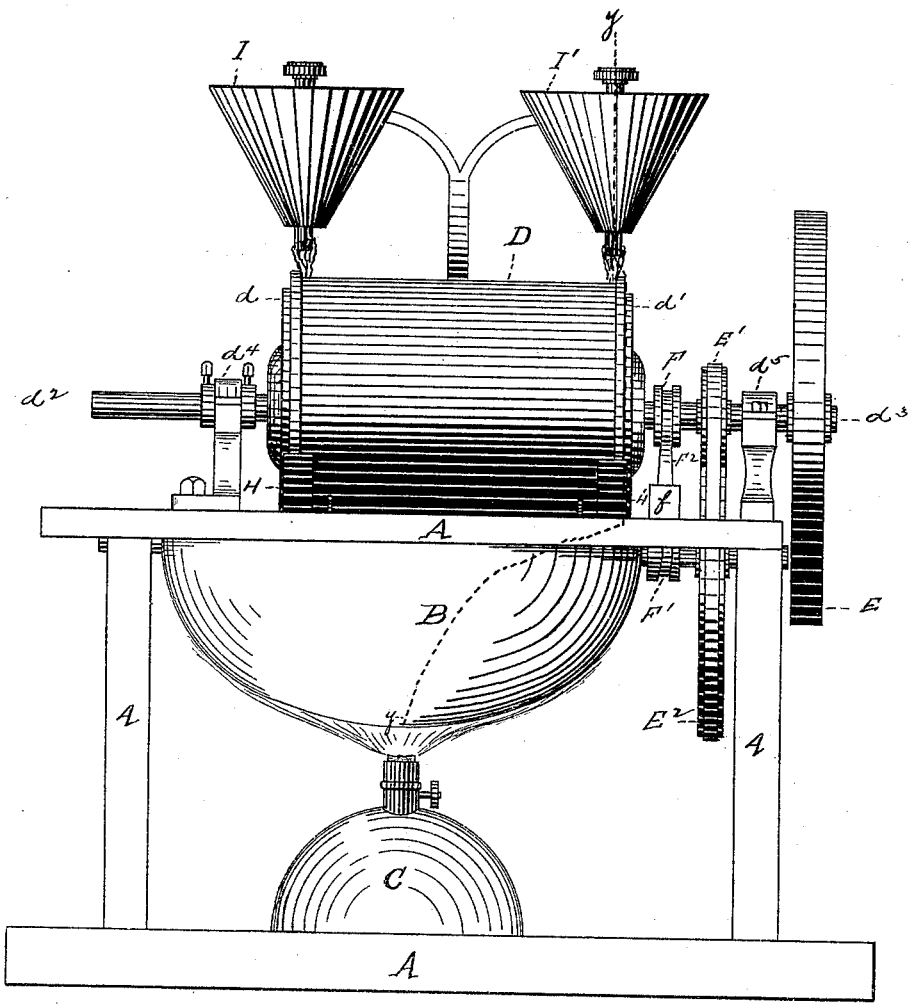

(No Model.) 3 Sheets—Sheet 1.

A. J. DUNCAN.
SOLDERING CYLINDRICAL ARTICLES OF TINWARE.

No. 271,319. Patented Jan. 30, 1883.

Witnesses,
Walter Reese
Jacob Reese

Inventor,
Andrew J. Duncan
by
Frank M. Reese, Atty (No Model.) 3 Sheets—Sheet 2.
A. J. DUNCAN.
SOLDERING CYLINDRICAL ARTICLES OF TINWARE.
No. 271,319. Patented Jan. 30, 1883.
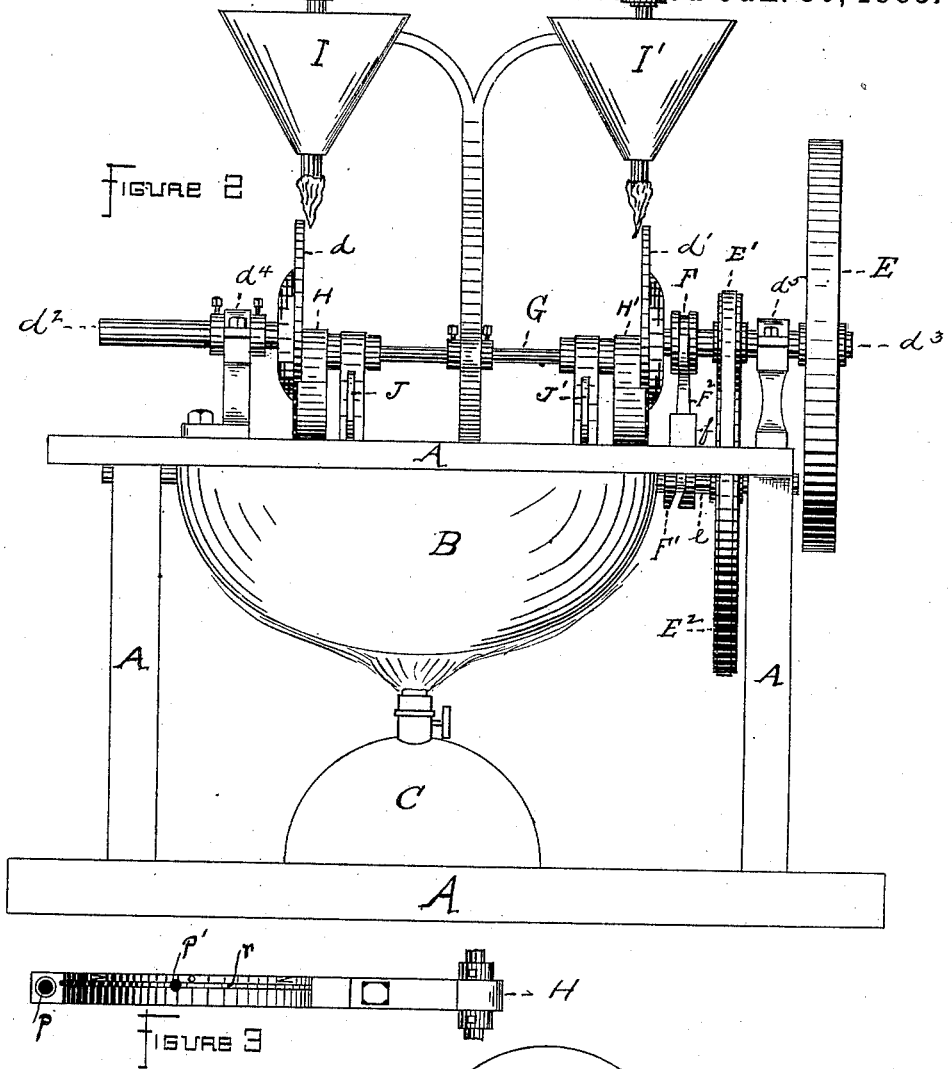
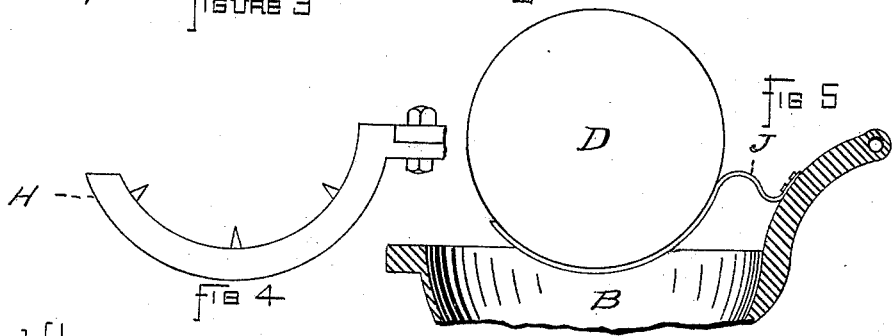
Witnesses.
Walter Reese
Jacob Reese
Inventor.
Andrew J. Duncan
by
Frank M. Reese, atty (No Model.) 3 Sheets—Sheet 3.
A. J. DUNCAN.
SOLDERING CYLINDRICAL ARTICLES OF TINWARE.
No. 271,319. Patented Jan. 30, 1883.
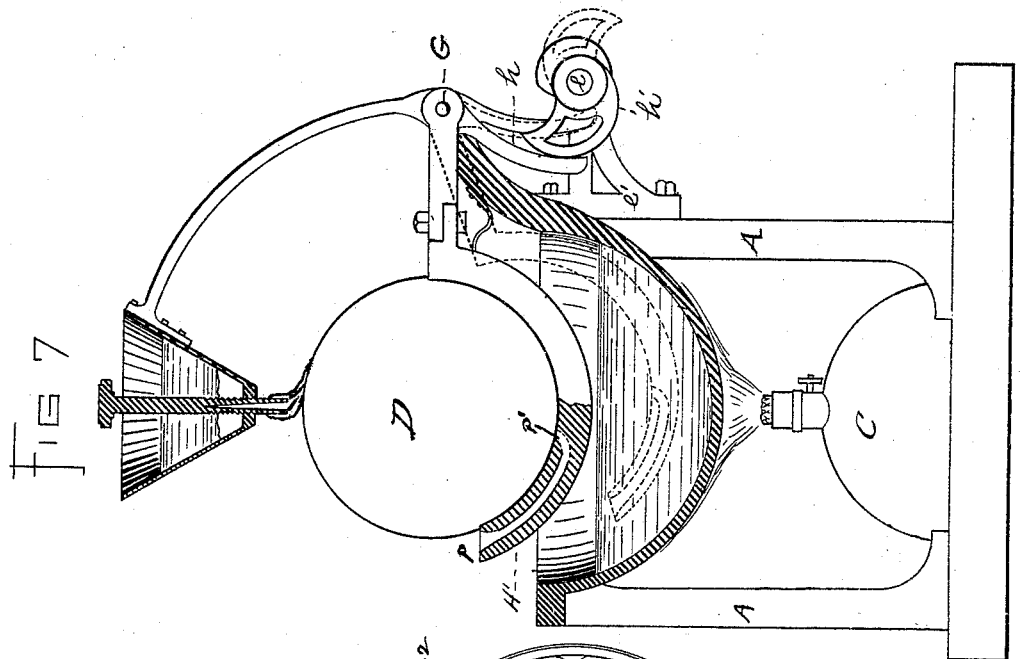
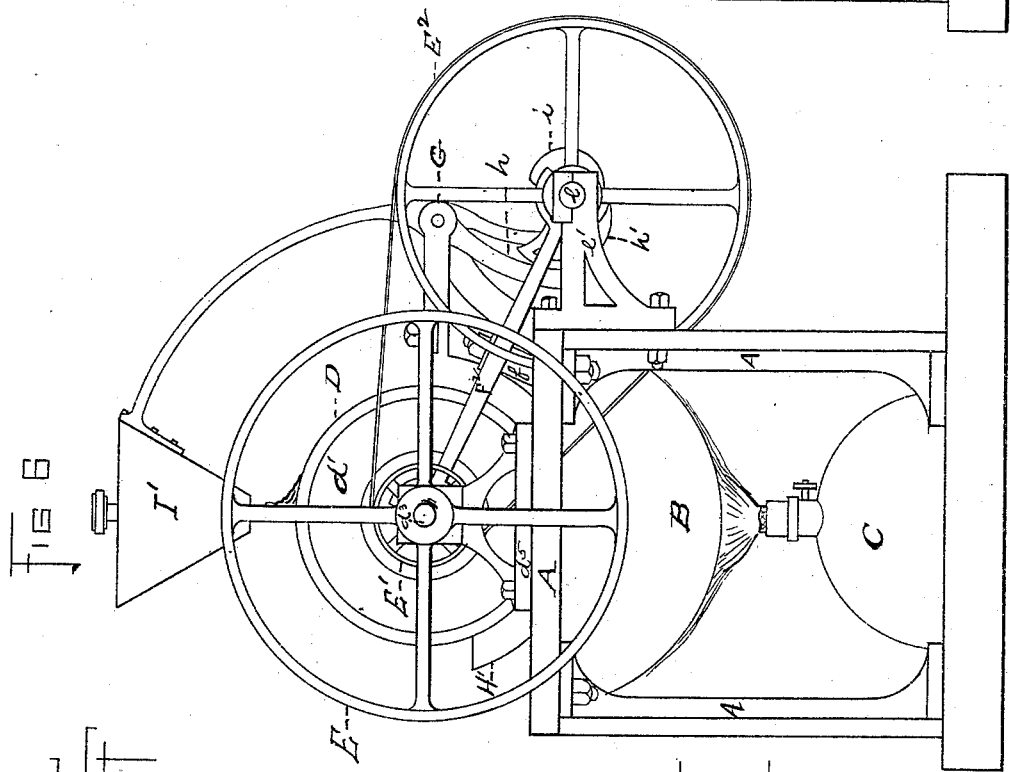

UNITED STATES PATENT OFFICE.

ANDREW J. DUNCAN, OF PITTSBURG, PENNSYLVANIA.

SOLDERING CYLINDRICAL ARTICLES OF TINWARE.

SPECIFICATION forming part of Letters Patent No. 271,319, dated January 30, 1883.

Application filed January 26, 1882. (No model.)

To all whom it may concern:

Be it known that I, ANDREW J. DUNCAN, residing at Pittsburg, in the county of Allegheny and State of Pennsylvania, have invented certain new and useful Improvements in Soldering Cylindrical Articles of Tinware; and I do hereby declare the following to be a full, clear, and exact description thereof, reference being had to the accompanying drawings, in which—

Figure 1 on Sheet 1 indicates a front elevation of my improved soldering apparatus with a can adjusted in position for soldering. Fig. 2 on Sheet 2 indicates a front elevation of the apparatus after the removal of the soldered can. Fig. 3 on Sheet 2 indicates a plan view of one of the soldering-irons. Fig. 4 on Sheet 2 indicates a side view of the same. Fig. 5 on Sheet 2 indicates a sectional elevation of a portion of the soldering-pot and an end view of a can resting upon supporting-wires. Fig. 6 on Sheet 3 indicates an end view of the soldering apparatus. Fig. 7 on Sheet 3 indicates a sectional elevation of the apparatus, taken through at the irregular line $y\ y$ shown in Fig. 1.

Like letters of reference indicate like parts wherever they occur.

My invention consists in a new and useful construction and arrangement of the soldering-irons and their actuating mechanism, whereby the former may be quickly raised to the required temperature for soldering by their immersion in a bath of molten solder, and may then be removed therefrom and carry a portion of the molten solder and apply it to the joints to be soldered.

The object of my improvement is to produce narrow, smooth, even, and securely-soldered seams in the finished article. In practice I have found that the essential conditions upon which the attainment of this object depend are, first, the temperature of the soldering-iron must be sufficiently high to cause the solder to flow readily between the edges of the seam, and that it must also heat up the surfaces of the metal at the joint to a certain temperature, as otherwise the solder will set too quick, not flow properly, and adheres with little force to the joint of the article when finished; secondly, the temperature of the iron must never be allowed to become so high as to cause the oxidation of the tin at the seam, as a very imperfectly soldered joint would be the result; thirdly, the solder should be removed up from below the surface of the molten bath in order to secure it free from oxides, and it should be up to that portion of the seam only which is to be soldered; and, finally, the iron should possess a large rubbing-surface and be capable of producing a smoothly-finished joint. In order to secure these essential conditions, I employ a curved soldering-iron, or an iron having a large concave soldering-surface, capable of enveloping a large portion—say one-third to one-half—of the circumference of the seam, and provide it with a central longitudinal opening extending from its forward end to a point at the center of the soldering-surface. The iron is also provided with a groove along its soldering-surface to receive the seam of the can and expose it to the action of a narrow stream of solder, and is also preferably provided with a series of projecting points, which act as guides to retain the seam in the groove and to strip off any drops of solder that form on the edges of the can. This iron is heated to the required temperature by its immersion into a bath of molten solder, and then conveys a portion of the solder to and applies it in a narrow stream to the seam to be soldered, being actuated by suitable mechanism for that purpose.

In the drawings, Fig. 1 indicates a front elevation of the automatic soldering apparatus. A indicates the frame-work supporting the mechanism, and B indicates an oblong cast-iron soldering-pot, which is cast with an outwardly-projecting flange at its upper portion, in order that it may fit in an oblong hole in and be suspended from the top of the frame or table; or it may be secured in position in any other suitable manner.

C indicates a gas or lamp fixture located under the pot, to impart heat to the same to melt the solder and retain it in a fluid condition and at any desired temperature.

B indicates a cylindrical can to which the top and bottom are to be soldered, and it is held in position by means of two circular face-plates, $d$ and $d'$, which are respectively mounted on the shafts $d^2$ and $d^3$. The shaft $d^2$ is journaled in a pillow-block, $d^4$, which may be adjusted backward and forward and be bolted to the frame at any point in order to increase or decrease the distance between the face-plates for the reception of different lengths of ware. This shaft may also be adjusted longitudinally in its bearings by set-screws, if desired. The main driving-shaft $d^3$ is journaled in the pillow-block $d^5$ in such a manner as to allow it to be forced backward and forward in order to cause its face-plate $d'$ to engage one end of a can and force the other end of the can against the opposite face-plate, $d$.

E indicates a driving-pulley keyed on one end of the driving-shaft $d^3$.

E' indicates a small pulley keyed on the main shaft, and serves to communicate motion by a belt to a large pulley, $E^2$, keyed on a counter-shaft, $e$, which is supported on suitable brackets, $e'$, which are attached to the back of the frame. These pulleys E and E' are of such relative size as will cause the counter-shaft to rotate one revolution to every five revolutions of the main driving-shaft.

F indicates an annular collar having a straight groove running around its periphery, and is keyed firmly to the main driving-shaft.

F' indicates an annular cam slotted or grooved collar, which is mounted or keyed securely on the counter-shaft $e$ at an opposite point to the annular slotted collar F on the main driving-shaft.

$F^2$ indicates a lever having a central pivotal connection, $f$, and its ends operate in the slotted collars, in order that the lateral movement imparted to one end of the lever by the action of the cam-faced annular collar F' may impart a reverse lateral movement to the main driving-shaft $d^3$, and thus automatically force it backward and forward at proper intervals to release and engage the articles operated upon.

The annular cam faced or grooved collar F' should have the line of the walls of the groove formed in such a manner as to throw the face-plate forward during the first one-half revolution of the main shaft around its axis, and to maintain the face-plate in that position during the next two revolutions, then withdraw it quickly and hold it in a withdrawn position until the main shaft has turned five revolutions in all and the counter-shaft and its cam-faced collar has completed one revolution, the object being to engage the end of the can quickly, rotate it a couple of times, and then release it quickly, so as to give sufficient time to replace it with another before the face-plate is again thrust forward.

G indicates a shaft upon which the supports of the salt or acid cans and the soldering-bits are pivoted. This shaft is supported by suitable brackets which extend up from the rear of the table or frame.

H and H' indicate a set of soldering-irons provided with a grooved concave soldering-surface, and with a solder-channel, $p$, extending through their centers from their forward ends to a point, $p'$, at or near the center of their concave soldering-surface. They are also preferably provided with a series of pins or projections; or a single projecting surface may be formed, extending up along the side of the groove in order to guide the edges of the can into the narrow groove $r$, containing the molten solder on the concave soldering-surfaces. These soldering-irons are attached to bars of iron which are pivoted on the shaft G, and these bars are provided with downwardly-projecting arms $h$, which are alternately acted upon and released by cams $h'$, mounted on the counter-shaft $e$, in such a manner as to cause the soldering-irons to rise up out of the soldering-pot and press against the joints of the article to be soldered during the one-half of a revolution of the counter-shaft around its axis. The cams $h'$ are then released from the ends of the downwardly-projecting arms $h$ and the forward portion of the bar, and the irons, being heaviest, cause the soldering-irons to drop down and remain submerged in the molten solder until the full revolution of the counter-shaft has been made around its axis. The objects of this action are, first, to submerge the soldering-irons in the melted solder for a sufficient length of time at the end of each soldering operation to heat them to the exact temperature required for the succeeding operation; second, to enable them to receive a fresh supply of solder from below the dross and oxides present upon the surface of the bath; and, third, to apply pure solder at the joints of the article, and then withdraw the irons out of the way for a sufficient length of time to allow the replacement of the can with another before the irons are again forced upward into position for soldering.

I and I' indicate a set of conical salt or acid cans, which are each provided with an adjusting-screw passing through at their lower end. These adjusting-screws are provided with longitudinal slots, gradually decreasing in size from their lower end up to their stems, and they are also provided with wads of felt or other fluid-absorbing substance attached to their lower extremities. The objects of this construction and arrangement are to allow the flow of salts or acids from the cans to be regulated to any degree desired through the action of the adjusting-screws, and to prevent any loss of acid or salts when the can is not in position, to prevent the application of an excessive amount of the acid, and to cause it to be applied only to those portions of the surface which are to be covered with solder, in order that the discoloration of the adjacent portions of the surface may be avoided. These salt or acid cans are attached to an upright support, which is pivoted to the shaft G in such a manner that its lower end may engage with a cam, $i$, which is keyed on the counter-shaft $e$, and possesses such a form and is arranged in such a position in relation to the arrangement of the cams $h'$ as to engage the lower end of the upright support and raise the soldering acid-cans to prevent the contact of the saturated wads on the lower ends of the screws with the surface of the can during the latter part of the soldering operation, and to retain them in such position until the next can is placed in position, at which point, the lower end of the support being relieved from the action of the cam $i$, the cans swing downward, the wads come in contact with the joints of the can, and the salt or acid is distributed along the joints just previous to the next succeeding soldering operation.

From the preceding matter it will be readily understood that the first action of the mechanism will be to force the face-plate $d'$ forward to engage the can and rotate it. The lower end of the support of the acid-cans is then relieved from the action of the cam $i$, and they swing downward and the acid is distributed around the surface of the joints, and in the meantime the soldering-irons swing up out of the bath and press against and solder the joints, these operations taking place consecutively, and requiring two and one-half revolutions of the main shaft, or one-half of a revolution of the counter-shaft, for their performance. At this point (or, more properly, slightly before it) the salt or acid cans are raised until their saturated wads are out of contact with the surface of the joints by the action of the cam $i$ on the lower end of their support. The soldering-irons shortly after drop down into the bath of solder and the face-plate is withdrawn, and these devices remain in a withdrawn position until the main shaft has completed five revolutions around its axis from the beginning of the operation, thus allowing about two out of the five revolutions to withdraw the can and replace it with another.

As the mechanism described is designed to automatically carry out my method and to operate at a rapid rate, I prefer to attach a set of curved wires, J and J', to the frame of the machine in such a manner as to adjust the can in proper position to center on the face-plates when it is dropped upon them. These supporting and centering wires should be formed or curved to a proper form to engage the different sizes of articles operated upon, and should be removably connected with the stand, so that different sets may be used for different sizes or diameters of ware.

In the drawings I have shown an automatic acting apparatus provided with two sets of soldering-irons for soldering two heads on a can at the same operation. In cases where only one end is to be soldered on, the other soldering-iron should be disconnected from the bar, and a round or slightly conical piece of hard wood adapted to engage in the interior of the article to be soldered should be screwed into the face-plate of the main driving-shaft, and the can may be slipped over this plug, which will secure and rotate it during the soldering operation. In this case it may be observed that it is not necessary that the main driving-shaft should be capable of having a lateral movement, as the can may readily be secured in position and rotated by simply shoving it over the rotating block by hand.

The soldering-irons employed should always possess a concave soldering-surface of the requisite shape to engage the surface of the cans to be operated upon, and therefore different sets should be used for different diameters of cans. They should always be provided with a narrow shallow groove running along their concave surfaces, in order that when they are raised out of the bath the dirt or dross may flow off to the sides of the irons, and a narrow stream of fluid solder may be applied to and run in between the joints. This narrow groove also forms a guide or channel in which the ends of the cans rotate, and furnishes a large rubbing or smoothing surface which removes any superfluous solder from the joint during the operation and insures a narrow, smooth, uniform, and perfect line of solder around the finished article. As before stated, these irons are formed with an internal solder-channel extending from their forward ends to a point near their central soldering-surface, as this construction will not only afford a large reserve supply of solder during the operation, but will also cause the irons to heat up quicker while they are submerged in the bath.

The mechanism which I have shown and described is especially adapted for turning out large quantities of the same size of ware; but as it is necessary to employ different-sized cams for actuating the soldering-irons for each different diameter of ware, where it is intended to be used for rapidly turning out small lots of different diameters of ware, I form the downwardly-projecting arms of the bars to which the soldering-irons are attached of a thin flat piece of spring-steel, in which case the same set of actuating-cams may be used for soldering different shapes and diameters of ware, as the soldering-irons will always be brought to the desired height and exert a sufficiently strong but yielding pressure against the surface of the rotating can.

The advantages of my invention are, first, the soldering-irons may be always heated to the exact temperature required for the soldering operation, thereby heating up the surface of the article operated upon to a sufficient degree to enable the firm adhesion of the solder with it, and thereby tending to produce a sound joint; secondly, as the soldering-irons can never be heated to an excessive temperature, they cannot burn or oxidize the surface of the tin operated upon; third, as the solder is taken into the soldering-iron below the melted dross on the top of the bath, a pure stream of solder is applied to the joints of the article operated upon; fourth, as the edges of the can rotate in a narrow groove along the concave surface of the irons, the edges are subjected to a large amount of frictional action, and the resulting articles possess more perfect, close, smooth, uniform, and narrow lines of solder than can be obtained by the use of any method or apparatus heretofore known to me; fifth, as the soldering salts or acids are applied while the article is rotating, and only at those portions which are to be covered with the solder, the discoloration of the surface of the finished article is avoided; sixth, a saving of fifty per cent. of solder is effected; seventh, a great output can be secured without the use of skilled labor, as from ten to fifteen gross may be readily turned out by a small machine operated by hand in eight or ten hours, and by the use of power applied to such a machine as described from twenty to thirty cans per minute may be soldered, either at one or at both ends; eighth, the machinery is simple and costs comparatively little; and, finally, a neater, cleaner, smoother, and better soldered can can be produced than by the use of any other method and mechanism for soldering known to me.

Having described my invention, what I claim, and desire to secure by Letters Patent, is—

1. A curved soldering-iron having a central opening or solder-cup extending from its forward end to a point at or near the center of its concave soldering-surface, substantially as specified, whereby the iron is adapted to receive a portion of solder from a molten bath, elevate it therefrom, and apply it to the portion of the article to be soldered, substantially as and for the purpose herein set forth.

2. In a soldering-machine, the combination of a curved soldering-iron having a central solder cup or channel extending from one of its ends to a point at or near the center of its soldering-surface, with mechanism for depressing said iron into a bath of molten solder, withdrawing it out of the same, and then forcing it against the surface to be soldered, substantially as and for the purpose specified.

3. In a soldering-machine, the combination of a revolving can-holder for rotating a can above and without contact with a bath of molten solder, a soldering-iron having a central solder cup or channel extending from one of its ends to a point at or near the center of its concave soldering-surface, and mechanism for depressing said iron below the surface of the bath, elevating it out of the same, and then forcing it in contact with the article to be soldered, substantially as and for the purpose specified.

ANDREW J. DUNCAN.

Witnesses:
FRANK M. REESE,
WALTER REESE.